United States Patent
Kidachi et al.

(10) Patent No.: US 10,718,427 B2
(45) Date of Patent: Jul. 21, 2020

(54) HYDRAULIC PRESSURE SUPPLY SYSTEM

(71) Applicant: SUBARU CORPORATION, Tokyo (JP)

(72) Inventors: Daisuke Kidachi, Tokyo (JP);
Kazuyuki Kubota, Tokyo (JP);
Tomoyo Inooka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/182,025

(22) Filed: Nov. 6, 2018

(65) Prior Publication Data

US 2019/0211920 A1 Jul. 11, 2019

(30) Foreign Application Priority Data

Jan. 10, 2018 (JP) ................................ 2018-002223

(51) Int. Cl.
| | |
|---|---|
| *F16H 61/00* | (2006.01) |
| *F16H 45/02* | (2006.01) |
| *F16H 61/14* | (2006.01) |
| *F16H 61/02* | (2006.01) |

(52) U.S. Cl.
CPC ......... *F16H 61/0031* (2013.01); *F16H 45/02* (2013.01); *F16H 61/0251* (2013.01); *F16H 61/143* (2013.01); *F16H 2045/0215* (2013.01); *F16H 2061/0253* (2013.01); *F16H 2061/0255* (2013.01)

(58) Field of Classification Search
CPC .................................................. F16H 61/0031
See application file for complete search history.

(56) References Cited

U.S. PATENT DOCUMENTS

| | | | |
|---|---|---|---|
| 9,989,148 B2* | 6/2018 | Ogata | ................. F16H 61/0031 |
| 2017/0259825 A1* | 9/2017 | Okada | ................. F16H 61/0031 |
| 2019/0063598 A1 | 2/2019 | Tsuchida et al. | |

FOREIGN PATENT DOCUMENTS

| | | |
|---|---|---|
| JP | 2009-210112 A | 9/2009 |
| JP | 2010-209991 A | 9/2010 |
| JP | 2012-225466 A | 11/2012 |
| JP | 2014-105665 A | 6/2014 |
| JP | 2017-161059 A | 9/2017 |
| WO | WO 2017-163855 | 11/2018 |

OTHER PUBLICATIONS

Japanese Office Action dated Oct. 23, 2019 in corresponding Japanese Patent Application No. 2018-002223, with an English translation thereof.

* cited by examiner

*Primary Examiner* — Michael Leslie
(74) *Attorney, Agent, or Firm* — McGinn I.P. Law Group, PLLC

(57) ABSTRACT

A hydraulic pressure supply system includes a mechanical oil pump, an electric oil pump, a first flow path, a second flow path, and a cut-off mechanism. The mechanical oil pump is configured to operate by power from an engine. The electric oil pump is configured to operate by power from a motor. In the first flow path, oil supplied from the mechanical oil pump and the electric oil pump flows, the first flow path being coupled to the mechanical oil pump and the electric oil pump. The second flow path branches off from the first flow path and is configured to cause an oil to return to an oil pan via a torque converter. The cut-off mechanism is configured to close off the second flow path by oil delivered from the electric oil pump.

7 Claims, 6 Drawing Sheets

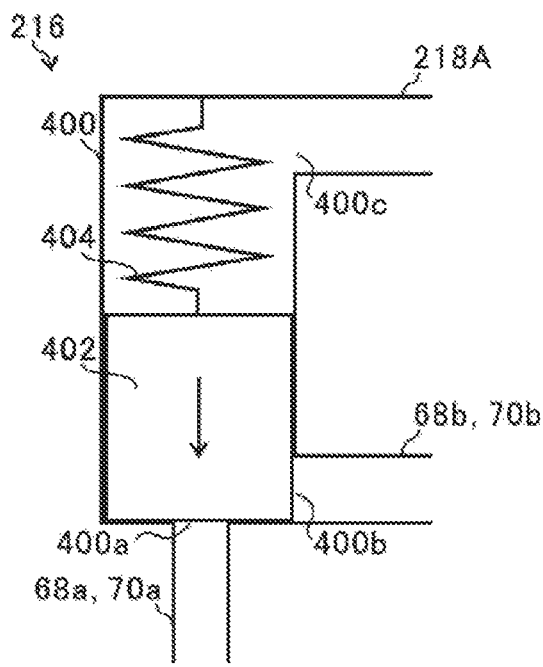
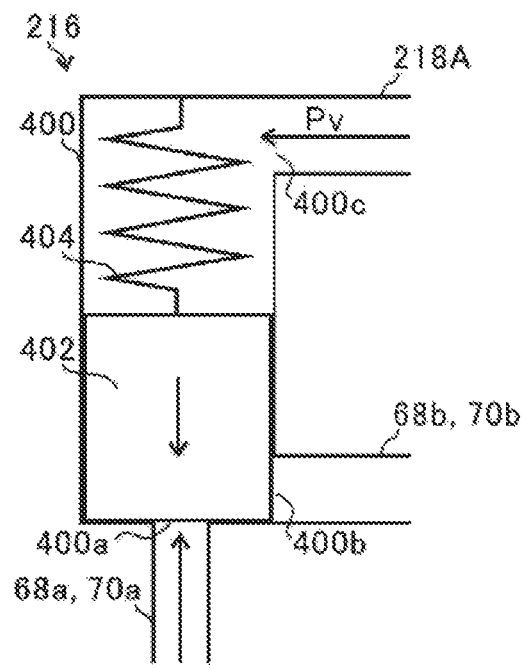
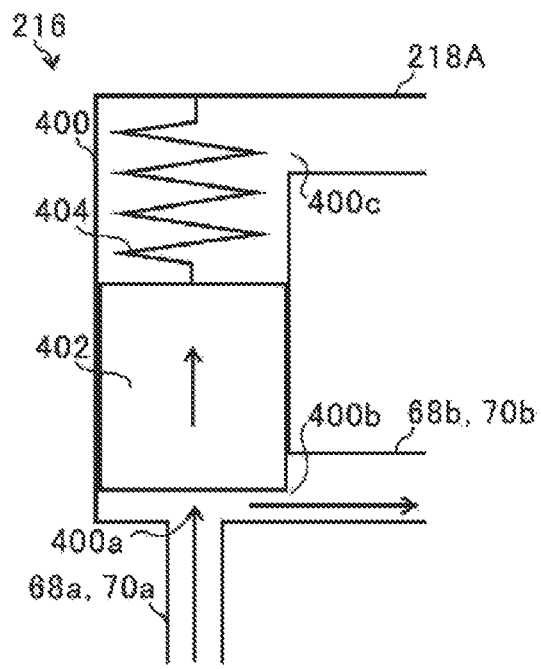

HYDRAULIC PRESSURE SUPPLY SYSTEM

CROSS-REFERENCE TO RELATED APPLICATIONS

The present application claims priority from Japanese Patent Application No. 2018-002223 filed on Jan. 10, 2018, the entire contents of which are hereby incorporated by reference.

BACKGROUND

1. Technical Field

The present invention relates to a hydraulic pressure supply system.

2. Related Art

Japanese Unexamined Patent Application Publication (JP-A) 2014-105665 discloses a hydraulic pressure supply system that includes a mechanical oil pump driven by an engine, and an electric oil pump driven by an electric motor, in order to supply oil to hydraulically operated devices. The mechanical oil pump stops driving as the engine stops when idling stop control is performed, for instance. Therefore, the electric oil pump is driven instead of the mechanical oil pump when idling stop control is performed.

SUMMARY OF THE INVENTION

An aspect of the present invention provides a hydraulic pressure supply system including: a mechanical oil pump configured to operate by power from an engine; an electric oil pump configured to operate by power from a motor; a first flow path through which an oil supplied from the mechanical oil pump and the electric oil pump flows, the first flow path being coupled to the mechanical oil pump and the electric oil pump; a second flow path branching off from the first flow path and configured to cause an oil to return to an oil pan via a torque converter; and a cut-off mechanism configured to close off the second flow path by an oil delivered from the electric oil pump.

BRIEF DESCRIPTION OF THE DRAWINGS

FIG. 6A is a schematic diagram of a configuration of a check valve according to a modified example;

FIG. 6B is a schematic diagram of a configuration of a check valve according to a modified example; and FIG. 6C is a schematic diagram of a configuration of a check valve according to a modified example.

DETAILED DESCRIPTION

Figure 1:
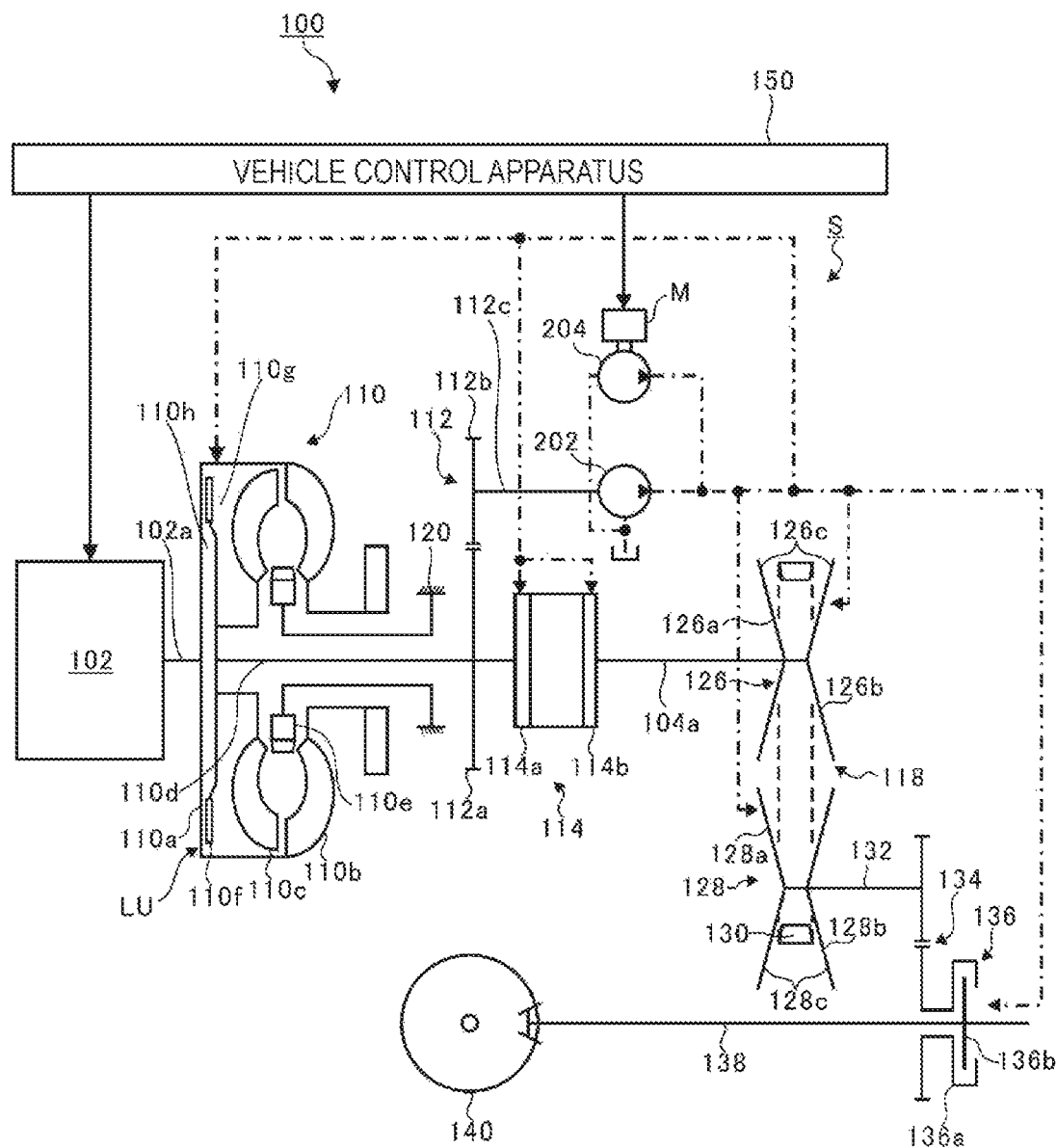
FIG. 1 is a view of a configuration of a drive system of a vehicle.

Hereinafter, preferred examples of the present invention will be described in detail with reference to the appended drawings. Dimensions, materials, and other specific numerical values and the like illustrated in the examples are merely examples to facilitate understanding of the invention, and in no way limit the present invention unless otherwise specified. The drawings are schematic and are not intended to be drawn to scale. Note that, in this specification and the appended drawings, structural elements that have substantially the same function and structure are denoted with the same reference numerals, and repeated description of these structural elements is omitted, and elements not directly related to the present invention are omitted from the drawings.

In JP-A 2014-105665, the engine speed immediately after idling stop ends, i.e., immediately after the engine restarts, is low, so the flowrate of oil discharged from the mechanical oil pump is small. Therefore, in order to ensure the required line pressure for the hydraulically operated devices, the mechanical oil pump will end up being larger which is problematic.

Therefore, it is desirable to provide a hydraulic pressure supply system in which the mechanical oil pump can be made smaller.

FIG. 1 is a view of a configuration of a drive system of a vehicle 100. In FIG. 1, the flow of control signals is indicated by solid arrows, and the flow of oil is indicated by alternate long and short dash arrows. As illustrated in FIG. 1, the vehicle 100 has an engine 102 as a drive source.

The engine 102 has a crankshaft 102a, and this crankshaft 102a is made to rotate as a result of a piston being made to move in a reciprocating manner by the engine 102 burning fuel in a combustion chamber.

A torque converter 110 is coupled to the crankshaft 102a of the engine 102. The torque converter 110 has a front cover 110a that is coupled to the crankshaft 102a, and a pump impeller 110b fixed to this front cover 110a. Also, in the torque converter 110, a turbine runner 110c is disposed facing the pump impeller 110b, inside the front cover 110a, and a turbine shaft 110d is coupled to this turbine runner 110c. Moreover, in the torque converter 110, a stator 110e is disposed on the inner peripheral side between the pump impeller 110b and the turbine runner 110c, and working fluid is sealed inside. Note that the stator 110e is fixed to a transmission case 120 inside of which are housed the torque converter 110, a forward-reverse switching mechanism 114, and a variable transmission 118 and the like.

The pump impeller 110b and the turbine runner 110c are each provided with multiple blades. As the pump impeller 110b rotates, the working fluid is thrown circumferentially outwards and strikes the turbine runner 110c, causing the turbine runner 110c to rotate. As a result, power is transmitted from the crankshaft 102a to the turbine runner 110c. That is, power from the engine 102 is transmitted to the turbine shaft 110d.

The stator 110e causes the direction of flow of the working fluid delivered from the turbine runner 110c to change, making the working fluid return to the pump impeller 110b, which in turn causes the rotation of the pump impeller 110b to accelerate. Therefore, the torque converter 110 is able to amplify the transmitted power.

Also, the torque converter 110 is provided with a lock-up mechanism LU that directly couples the crankshaft 102a that is an input element to the turbine shaft 110d that is an output element, in order to improve the transmission efficiency of engine power. The lock-up mechanism LU has a clutch plate 110f, an apply chamber 110g, and a release chamber 110h.

The clutch plate 110f is provided between the front cover 110a and the turbine runner 110c. The clutch plate 110f is supported on the turbine shaft 110d so as to be movable in the axial direction of the turbine shaft 110d, and rotate in a unified manner with the turbine shaft 110d. The clutch plate 110f rotates in a unified manner with the front cover 110a when pushed against the front cover 110a by the hydraulic pressure of oil supplied from a mechanical oil pump 202 that will be described later. As a result, the turbine shaft 110d rotates in a unified manner with the crankshaft 102a via the clutch plate 110f, such that the power of the engine 102 is directly transmitted from the crankshaft 102a to the turbine shaft 110d. Also, the power that is transmitted from the crankshaft 102a to the turbine shaft 110d can be adjusted by controlling the hydraulic pressure of the oil such that the clutch plate 110f abuts against the front cover 110a while sliding.

The apply chamber 110g is formed as an engaging oil chamber on the turbine runner 110c side of the clutch plate 110f. The release chamber 110h is formed as a disengaging oil chamber on the front cover 110a side of the clutch plate 110f. When oil is supplied to the apply chamber 110g, the clutch plate 110f is consequently pushed against the front cover 110a, such that the lock-up mechanism LU is placed in an engaged state in which the crankshaft 102a is directly coupled to the turbine shaft 110d. On the other hand, when oil is supplied to the release chamber 110h, the clutch plate 110f is consequently pulled away from the front cover 110a, such that the lock-up mechanism LU is placed in a disengaged state in which the crankshaft 102a is separated from the turbine shaft 110d. Also, the force with which the clutch plate 110f pushes against the front cover 110a can be adjusted by adjusting the pressures in the release chamber 110h and the apply chamber 110g, thus making it possible to control the lock-up mechanism LU to a slip state.

A gear mechanism 112 includes a first gear 112a and a second gear 112b. The first gear 112a is in mesh with the turbine shaft 110d, and thus rotates in a unified manner with the turbine shaft 110d. The second gear 112b is fitted to an input shaft 112c and is in mesh with the first gear 112a, and thus rotates in a unified manner with the input shaft 112c as the first gear 112a rotates. The input shaft 112c is coupled to the mechanical oil pump 202. When the turbine shaft 110d rotates, the gear mechanism 112 also rotates, and the mechanical oil pump 202 is driven as the gear mechanism 112 rotates.

The forward-reverse switching mechanism 114 is provided between a rotating shaft 104a and the turbine shaft 110d, and switches between coupling and decoupling the rotating shaft 104a to and from the turbine shaft 110d. More specifically, the forward-reverse switching mechanism 114 switches between coupling and decoupling the turbine shaft 110d to and from the rotating shaft 104a by the hydraulic pressure of oil supplied from the mechanical oil pump 202 or an electric oil pump 204.

The forward-reverse switching mechanism 114 includes a forward-reverse switching clutch (hereinafter, referred to as forward clutch) 114a and a forward-reverse switching brake (hereinafter, referred to as reverse brake) 114b, and these are both operated by hydraulic pressure. When the forward clutch 114a is engaged (ON) and the reverse brake 114b is released (OFF), the rotating shaft 104a is made to rotate in the forward direction by power from the engine 102. When the forward clutch 114a is released (OFF) and the reverse brake 114b is engaged (ON), the rotating shaft 104a is made to rotate in the reverse direction by power from the engine 102. When the forward clutch 114a and the reverse brake 114b are both released (OFF), a neutral state is realized, in which power from the engine 102 is not transmitted to the rotating shaft 104a.

The variable transmission 118 includes a primary pulley 126, a secondary pulley 128, and a belt 130. The primary pulley 126 is provided on the rotating shaft 104a, and the secondary pulley 128 is provided on a parallel shaft 132 disposed in parallel with respect to the rotating shaft 104a. The belt 130 is a chain belt in which link plates are interlocked with rocker pins. The belt 130 extends between the primary pulley 126 and the secondary pulley 128, and transmits power between the primary pulley 126 and the secondary pulley 128.

The primary pulley 126 includes a pair of sheaves 126a and 126b. The pair of sheaves 126a and 126b are provided facing each other in the axial direction of the rotating shaft 104a. Also, the opposing surfaces of both of the pair of sheaves 126a and 126b are generally conical cone surfaces 126c, such that a groove in which the belt 130 rides is formed by these cone surfaces 126c.

Similarly, the secondary pulley 128 includes a pair of sheaves 128a and 128b. The pair of sheaves 128a and 128b are provided facing each other in the axial direction of the parallel shaft 132. Also, the opposing surfaces of both of the pair of sheaves 128a and 128b are generally conical cone surfaces 128c, such that a groove in which the belt 130 rides is formed by these cone surfaces 128c.

Also, the position of the sheave 126b of the primary pulley 126 in the axial direction of the rotating shaft 104a can be changed by the hydraulic pressure of oil supplied from the mechanical oil pump 202 or the electric oil pump 204. Also, the position of the sheave 128a of the secondary pulley 128 in the axial direction of the parallel shaft 132 can be changed by the hydraulic pressure of oil supplied from the mechanical oil pump 202 or the electric oil pump 204.

In this way, the distance between the pair of sheaves 126a and 126b of the primary pulley 126 that face each other, and the distance between the pair of sheaves 128a and 128b of the secondary pulley 128 that face each other, can be changed. Therefore, when the distances between the cone surfaces 126c and 128c change, such that the widths of the grooves in which the belt 130 rides change, the position where the belt 130 rides changes.

Using the primary pulley 126 as an example, when the distance between the opposing cone surfaces 126c becomes wider, such that the width of the groove in which the belt 130 rides becomes wider, the position where the belt 130 rides on the cone surfaces 126c moves toward the radially inner side, so the winding diameter of the belt 130 becomes smaller. However, when the distance between the opposing cone surfaces 126c becomes narrower, such that the width of the groove in which the belt 130 rides becomes narrower, the position where the belt 130 rides on the cone surfaces 126c moves toward the radially outer side, so the winding diameter becomes larger. In this way, the variable transmission 118 continuously changes the power transmitted between the rotating shaft 104a and the parallel shaft 132.

The parallel shaft 132 is coupled to a fixed case 136a of an output clutch 136 via a gear mechanism 134. In the output clutch 136, the fixed case 136a is disposed facing a movement member 136b that is coupled to an axle 138, and the movement member 136b moves toward the fixed case 136a by the hydraulic pressure of oil supplied from the mechanical oil pump 202 or the electric oil pump 204.

When the output clutch 136 is in an interrupted state in which the fixed case 136a and the movement member 136b are separated, the output clutch 136 interrupts the transmission of power between the parallel shaft 132 and the axle 138. Also, when the output clutch 136 is in a coupled state in which the movement member 136b is pushed against the fixed case 136a by hydraulic pressure, power is transmitted between the parallel shaft 132 and the axle 138, and this power is output to a wheel 140 that is coupled to the axle 138.

Also, in a case where the output clutch 136 receives power (disturbance) of an amount greater than the amount allowed to be transmitted from the axle 138 itself, the movement member 136b slips with respect to the fixed case 136a, such that the transmission of power is limited to less than or equal to the allowed amount, so power greater than the amount of power allowed for the variable transmission 118 will not be transmitted to the variable transmission 118. That is, the output clutch 136 functions as a power fuse.

A vehicle control apparatus 150 includes a semiconductor integrated circuit that includes a central processing unit (CPU), ROM within which is stored programs and the like, and RAM that serves as a work area, and the like. The CPU executes various controls of the vehicle 100 by performing signal processing in accordance with the programs stored in the ROM in advance, while using the temporary storage function of the RAM. For instance, the vehicle control apparatus 150 executes drive control of the engine 102, and shift control of the variable transmission 118, and the like. Also, the vehicle control apparatus 150 executes drive control (hydraulic pressure control) of a hydraulic pressure supply system S that will be described later. More specifically, the vehicle control apparatus 150 executes drive control (hydraulic pressure control) of the lock-up mechanism LU, drive control (hydraulic pressure control) of the forward-reverse switching mechanism 114, drive control (hydraulic pressure control) of the variable transmission 118, and drive control (hydraulic pressure control) of the output clutch 136, and the like. Also, the vehicle control apparatus 150 executes idling stop control that causes the engine 102 to automatically stop when a predetermined stop condition is satisfied, and causes the engine 102 to restart when a predetermined restart condition is satisfied. In this way, the vehicle control apparatus 150 comprehensively controls the entire vehicle 100.

Here, as described above, the torque converter 110, the forward-reverse switching mechanism 114, the variable transmission 118, and the output clutch 136 (hereinafter, these may also be referred to as a power transmission mechanism) function as hydraulic pressure operated devices that operate by the supply of oil. When oil is supplied to these hydraulic pressure operated devices, a power transmission path that transmits the power of the engine 102 to the wheel 140 is consequently coupled, interrupted, or changed so as to change speed. Also, the vehicle 100 of the present example is provided with the hydraulic pressure supply system S that supplies oil to each of the hydraulic pressure operated devices of the power transmission mechanism.

The hydraulic pressure supply system S includes the mechanical oil pump 202 and the electric oil pump 204. The mechanical oil pump 202 is driven by the power of the engine 102. The electric oil pump 204 is driven by the power of an electric motor M. The electric motor M is coupled to a battery (not illustrated), and is rotatably driven by electric power supplied from this battery.

In the present example, the vehicle control apparatus 150 causes the engine 102 to temporarily stop (idling stop) by executing fuel cut control or the like, in a case where a predetermined engine stop condition (idling stop start condition) is satisfied, for instance. Note that the engine stop condition may be, for instance, that the vehicle speed is 0, and an electronic device is being used at a power that is less than a determined power or the like.

However, when idling stop control is being performed, it is necessary to ensure the hydraulic pressure required for the forward clutch 114a. However, when the engine 102 stops being driven, the mechanical oil pump 202 that uses the engine 102 as a power source also stops operating. Therefore, when idling stop control is being performed, oil is unable to be supplied from the mechanical oil pump 202 to each of the hydraulic pressure operated devices. Thus, the vehicle control apparatus 150 causes the electric motor M to drive when idling stop control is being performed. The hydraulic pressure supply system S supplies oil from the electric oil pump 204 to each of the hydraulic pressure operated devices by the driving of the electric motor M. As a result, the hydraulic pressure of the forward clutch 114a is maintained, thereby enabling good responsiveness when the engine is restarted.

On the other hand, the vehicle control apparatus 150 restarts the engine 102 by executing fuel supply control and ignition timing control in a case where a predetermined engine restart condition (idling stop end condition) is satisfied. Note that engine restart condition is that the brake pedal be released and an electronic device is being used at a power that is equal to or greater than a determined power.

Here, when the engine 102 restarts immediately after idling stop ends, the belt 130 may slide on the cone surfaces 126c and 128c and scratch (damage) the cone surfaces 126c and 128c if the hydraulic pressure required for the variable transmission 118 is insufficient. If the cone surfaces 126c and 128c become scratched, the variable transmission 118 may be unable to shift normally. Therefore, it is necessary to ensure the hydraulic pressure required for the variable transmission 118 immediately after idling stop ends. However, immediately after the engine restarts, the flowrate of oil discharged from the mechanical oil pump 202 is low, which makes it difficult to ensure the hydraulic pressure required for the variable transmission 118. Therefore, the required line pressure for the variable transmission 118 immediately after the engine restarts has in the past been ensured by making the mechanical oil pump 202 larger. In contrast, the hydraulic pressure supply system S of the present example is configured as described below in order to make the mechanical oil pump 202 smaller. Hereinafter, the configuration of the hydraulic pressure supply system S of the present example will be described in detail.

Figure 2:
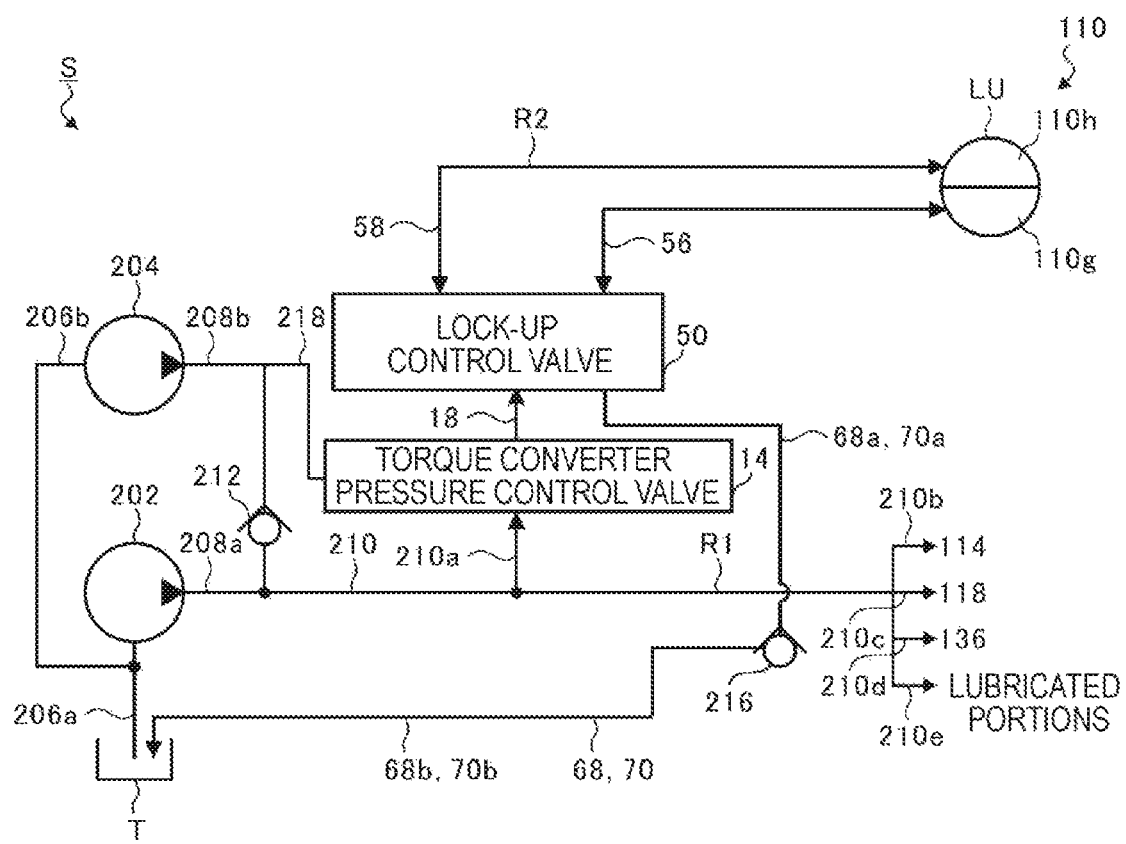
FIG. 2 is a schematic diagram of a configuration of a hydraulic pressure supply system according to the present example.

FIG. 2 is a schematic diagram of the configuration of the hydraulic pressure supply system S according to the present example. The hydraulic pressure supply system S is provided with an oil pan T in which oil is collected, and an intake port of the mechanical oil pump 202 is coupled to this oil pan T via an intake flow path 206a. Also, the intake flow path 206a branches off to an intake flow path 206b between the oil pan T and the mechanical oil pump 202. An intake port of the electric oil pump 204 is coupled to the intake flow path 206b. Also, a discharge flow path 208a is coupled to a discharge port of the mechanical oil pump 202, and a discharge flow path 208b is coupled to a discharge port of the electric oil pump 204.

The discharge flow path 208a and the discharge flow path 208b are coupled to a main flow path 210. Therefore, the oil that flows through the discharge flow path 208a and the oil that flows through the discharge flow path 208b merge at the main flow path 210. In this way, the portion where the discharge flow paths 208a and 208b couple to the main flow path 210 functions as a merge portion where the oil delivered from the mechanical oil pump 202 and the oil delivered from the electric oil pump 204 merge. Note that a check valve (a first flow path check valve) 212 is provided in the discharge flow path 208b to prevent the oil delivered from the mechanical oil pump 202 from flowing into the electric oil pump 204. Note that the discharge flow paths 208a and 208b, which are flow paths that are coupled to the mechanical oil pump 202 and the electric oil pump 204, and through which the oil supplied from the mechanical oil pump 202 and the electric oil pump 204 flows, and the main flow path 210, will collectively be referred to as a first flow path R1.

The main flow path 210 is coupled to branch flow paths 210a, 210b, 210c, 210d, and 210e. Oil that flows through the main flow path 210 is supplied to the torque converter 110, the forward-reverse switching mechanism 114, the variable transmission 118, and the output clutch 136 via the branch flow paths 210a, 210b, 210c, and 210d, respectively. Also, oil that flows through the main flow path 210 is supplied via the branch flow path 210e to each lubricated portion that requires oil for lubrication, power transmission, or cooling or the like within the transmission case 120. Each lubricated portion refers to, for instance, the portions where the belt 130 contacts the primary pulley 126 and the secondary pulley 128, bearings, and meshing portions of gears, and the like. Note that a torque converter pressure control valve 14, which will be described in detail later, is provided in the branch flow path 210a. The torque converter pressure control valve 14 is provided upstream of the torque converter 110 and a lock-up control valve 50, described later, in the branch flow path 210a, and controls the hydraulic pressure (line pressure) of oil that flows through the branch flow path 210a to a hydraulic pressure that can be supplied to the torque converter 110. Also, a pressure control valve, not illustrated, is provided in each of the branch flow paths 210b, 210c, 210d, and 210e, and the hydraulic pressure supplied to the forward-reverse switching mechanism 114, the variable transmission 118, the output clutch 136, and each lubricated portion, is regulated by controlling these pressure control valves. Also, a line pressure control valve, not illustrated, is coupled to the main flow path 210, and the line pressure is regulated by this line pressure control valve. Note that the branch flow paths 210a, 210b, 210c, 210d, and 210e that branch off from the first flow path R1 will each be referred to as a second flow path R2.

The branch flow path 210a has a supply flow path 18, supply/discharge flow paths 56 and 58, and discharge flow paths 68 and 70. The supply flow path 18 is coupled to the torque converter pressure control valve 14 and the lock-up control valve 50, described later, and supplies the hydraulic pressure of oil controlled by the torque converter pressure control valve 14 to the lock-up control valve 50. The lock-up control valve 50 switches the coupling destination of the supply flow path 18 between the supply/discharge flow path 58 and the supply/discharge flow path 56. The supply/discharge flow path 58 couples the lock-up control valve 50 to the release chamber 110h. The release chamber 110h and the apply chamber 110g are communicated via the clutch plate 110f. The supply/discharge flow path 56 couples the apply chamber 110g to the lock-up control valve 50. The discharge flow paths 68 and 70 couple the lock-up control valve 50 to the oil pan T, and discharge the oil delivered from the lock-up control valve 50 to the oil pan T.

Note that a cut-off valve (a second flow path cut-off valve) 216 is provided in the discharge flow paths 68 and 70 to prevent the hydraulic pressure within the supply/discharge flow paths 56 and 58 and upstream side discharge flow paths 68a and 70a, described later, from completely dropping (drain back). The cut-off valve 216 is provided downstream of the torque converter 110 and the lock-up control valve 50 in the branch flow path 210a, and is able to open and close the discharge flow paths 68 and 70. The side upstream of the cut-off valve 216 in the discharge flow paths 68 and 70 will be referred to as upstream side discharge flow paths 68a and 70a, and the side downstream of the cut-off valve 216 in the discharge flow paths 68 and 70 will be referred to as downstream side discharge flow paths 68b and 70b.

Figure 3:
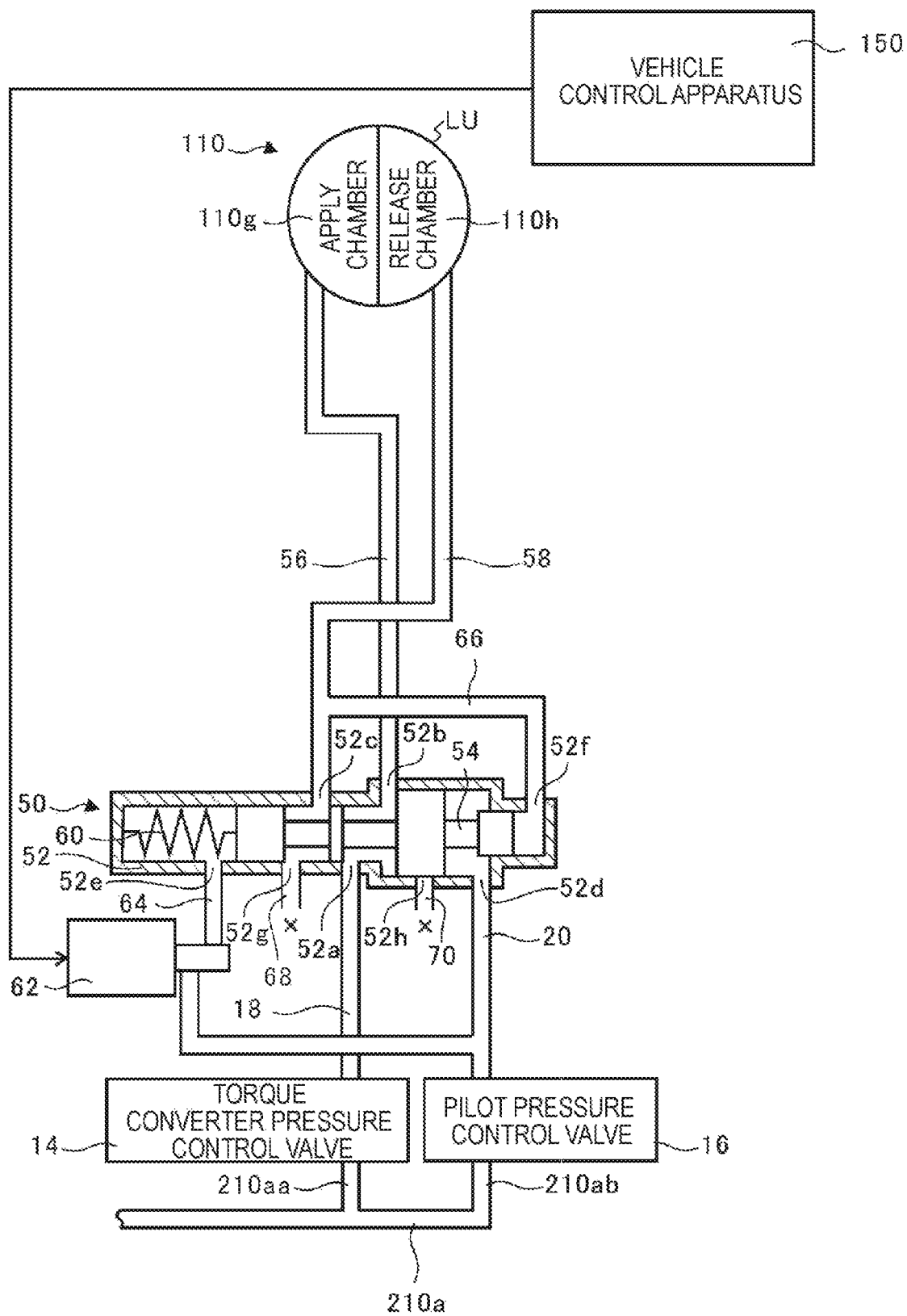
FIG. 3 is a schematic diagram of a hydraulic pressure control system of a torque converter according to the present example.

Next, a hydraulic pressure control system of the lock-up mechanism LU provided in the torque converter 110 will be described in detail. FIG. 3 is a schematic diagram of the hydraulic pressure control system of the torque converter 110 according to the present example. In FIG. 3, the flow of control signals is indicated by a solid arrow. A duty electromagnetic valve 62 is provided in the hydraulic pressure control system to supply oil to the apply chamber 110g and the release chamber 110h of the lock-up mechanism LU, as illustrated in FIG. 3. The duty electromagnetic valve 62 receives a control signal from the vehicle control apparatus 150, and the duty ratio is controlled by the vehicle control apparatus 150.

The branch flow path 210a branches off into a first branch flow path 210aa and a second branch flow path 210ab. The torque converter pressure control valve 14 is coupled to the first branch flow path 210aa, and a pilot pressure control valve 16 is coupled to the second branch flow path 210ab. The torque converter pressure control valve 14 reduces the line pressure to a predetermined torque converter pressure Pt and outputs this torque converter pressure Pt to the supply flow path 18, and the pilot pressure control valve 16 reduces the line pressure to a predetermined pilot pressure Pp and outputs this pilot pressure Pp to a pilot pressure path 20. Note that the torque converter pressure Pt that is output from the torque converter pressure control valve 14 will be supplied to the apply chamber 110g and the release chamber 110h of the torque converter 110 via the lock-up control valve 50.

The lock-up control valve 50 has a housing 52 and a spool valve shaft 54 movably housed within the housing 52. The housing 52 has a supply port 52a to which the supply flow path 18 that introduces the torque converter pressure Pt is coupled, a supply/discharge port 52b to which the supply/discharge flow path 56 that is communicated with the apply chamber 110g is coupled, and a supply/discharge port 52c to which the supply/discharge flow path 58 that is communicated with the release chamber 110h is coupled. Also, a spring member 60 is assembled to the spool valve shaft 54 to control the operating position of the spool valve shaft 54 such that the housing 52 has three pilot ports 52d to 52f. The pilot pressure path 20 that introduces the pilot pressure Pp from the pilot pressure control valve 16 is coupled to the pilot port 52d, a pilot pressure path 64 that introduces a pilot pressure Pc from the duty electromagnetic valve 62 is coupled to the pilot port 52e, and a pilot pressure path 66 that branches off from the supply/discharge flow path 58 is coupled to the pilot port 52*f*. Moreover, the housing 52 has two discharge ports 52*g* and 52*h*, and the discharge flow paths 68 and 70 are coupled to these discharge ports 52*g* and 52*h*, respectively.

This lock-up control valve 50 is able to control the communication state of each port 52*a* to 52*c*, 52*g*, and 52*h* by adjusting the operating position of the spool valve shaft 54, which is accomplished by controlling the pilot pressure Pc output from the duty electromagnetic valve 62. Here, the duty electromagnetic valve 62 is a normally open duty solenoid valve. The pilot pressure Pc is output at the maximum value (Pp) when the duty ratio of the duty electromagnetic valve 62 is controlled to 0%. Also, the pilot pressure Pc is output at the minimum value (0) when the duty ratio of the duty electromagnetic valve 62 is controlled to 100%. Further, the pilot pressure Pc can be controlled between the maximum value and the minimum value by adjusting the duty ratio between 0% and 100%.

Setting the pilot pressure Pc to the minimum value causes the spool valve shaft 54 to move to a lock-up engaging position (toward the left in FIG. 3). As a result, the lock-up control valve 50 is placed in a lock-up engaged state which causes the supply port 52*a* to communicate with the supply/discharge port 52*b*, and causes the supply/discharge port 52*c* to communicate with the discharge port 52*g*. When the lock-up control valve 50 is in this lock-up engaged state, oil that flows through the branch flow path 210*a* is introduced from the lock-up control valve 50 into the apply chamber 110*g* via the supply/discharge flow path 56. Also, the oil in the release chamber 110*h* is introduced into the lock-up control valve 50 via the supply/discharge flow path 58, and is discharged into the oil pan T via the discharge flow path 68. At this time, the clutch plate 110*f* is pushed against the front cover 110*a*, such that the lock-up mechanism LU is placed in an engaged state that directly couples the crankshaft 102*a* to the turbine shaft 110*d*.

On the other hand, setting the pilot pressure Pc to the maximum value causes the spool valve shaft 54 to move to a lock-up disengaging position (toward the right in FIG. 3). As a result, the lock-up control valve 50 is placed in a lock-up disengaged state which causes the supply/discharge port 52*b* to communicate with the discharge port 52*h*, and causes the supply port 52*a* to communicate with the supply/discharge port 52*c*. When the lock-up control valve 50 is in this lock-up disengaged state, oil that flows through the branch flow path 210*a* is introduced from the lock-up control valve 50 into the release chamber 110*h* via the supply/discharge flow path 58. Also, the oil in the apply chamber 110*g* is introduced into the lock-up control valve 50 via the supply/discharge flow path 58, and is discharged into the oil pan T via the discharge flow path 70. At this time, the clutch plate 110*f* is pulled away from the front cover 110*a*, such that the lock-up mechanism LU is placed in a disengaged state that separates the crankshaft 102*a* from the turbine shaft 110*d*.

Here, the lock-up control valve 50 is controlled to the lock-up disengaged state when idling stop control is executed. When the lock-up control valve 50 is in the lock-up disengaged state, the supply flow path 18 and the supply/discharge flow path 58 function as introduction flow paths that introduce oil to the hydraulic pressure operated devices (the lock-up mechanism LU) of the torque converter 110. Also, the supply/discharge flow path 56 and the discharge flow path 70 function as return flow paths that return the oil from the hydraulic pressure operated devices (the lock-up mechanism LU) of the torque converter 110 to the oil pan T. When the lock-up control valve 50 is in the lock-up disengaged state, the oil that has been introduced to the branch flow path 210*a* (the second flow path R2) is introduced to the release chamber 110*h* of the torque converter 110 via the introduction flow path, and then flows through the apply chamber 110*g*, after which it is returned to the oil pan T via the return flow path.

Note that setting the pilot pressure Pc between the minimum value and the maximum value causes the spool valve shaft 54 to stop between the lock-up engaging position and the lock-up disengaging position. Causing the spool valve shaft 54 to stop at a predetermined position on the lock-up engaging position side results in the lock-up control valve 50 being controlled to a slip engaged state that causes the supply port 52*a* to be communicated with the supply/discharge port 52*b* while throttling the opening area, and causes the supply/discharge port 52*c* to be communicated with the discharge port 52*g* while throttling the opening area. Also, causing the spool valve shaft 54 to stop at a predetermined position on the lock-up disengaging position side results in the lock-up control valve 50 being controlled to a slip disengaged state that causes the supply/discharge port 52*b* to be communicated with the discharge port 52*h* while throttling the opening area, and causes the supply port 52*a* to be communicated with the supply/discharge port 52*c* while throttling the opening area.

Here, the hydraulic pressure operated devices (the lock-up mechanism LU) of the torque converter 110 are operated to make the turbine shaft 110*d* rotate in a unified manner with the crankshaft 102*a*, as described above. Therefore, there is no need to make the lock-up mechanism LU operate from after idling stop ends (after the engine is restarted) until the rotation speeds of the crankshaft 102*a* and the turbine shaft 110*d* are close. Also, there is no need to make the lock-up mechanism LU operate while idling stop control is being executed (while the engine 102 is temporarily stopped). Therefore, the lock-up mechanism LU is controlled to the lock-up disengaged state from the time the engine 102 is temporarily stopped until the rotation speeds of the crankshaft 102*a* and the turbine shaft 110*d* after the engine is restarted are close. When oil is supplied to the lock-up mechanism LU while the lock-up mechanism LU is in the lock-up disengaged state, the oil passes through the return flow path and is returned as it is to the oil pan T. That is, when the lock-up mechanism LU is in the lock-up disengaged state, the oil that is output from the mechanical oil pump 202 or the electric oil pump 204 is consumed for circulation in the lock-up mechanism LU. Therefore, when the lock-up mechanism LU is in the lock-up disengaged state, the oil output from the mechanical oil pump 202 or the electric oil pump 204 is consumed in large quantities by the lock-up mechanism LU, so the line pressure of the main flow path 210 will have difficulty rising.

Therefore, in the present example, the hydraulic pressure supply system S is provided with a coupling flow path 218 that couples the discharge flow path 208*b* to the torque converter pressure control valve 14, as illustrated in FIG. 2. The coupling flow path 218 is coupled at one end to the discharge flow path 208*b* at a location between the electric oil pump 204 and the check valve 212, and is coupled at the other end to the torque converter pressure control valve 14. Therefore, when the electric oil pump 204 is operated, some of the oil that flows through the discharge flow path 208*b* is supplied to the torque converter pressure control valve 14. The torque converter pressure control valve 14 is closed by the hydraulic pressure of the oil supplied from the coupling flow path 218.

Figure 4A:
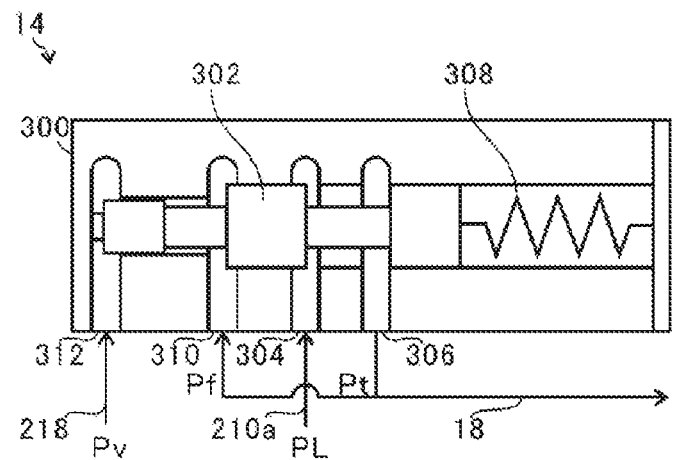
FIG. 4A is a schematic diagram of a configuration of a torque converter pressure control valve according to the present example.
Figure 4B:
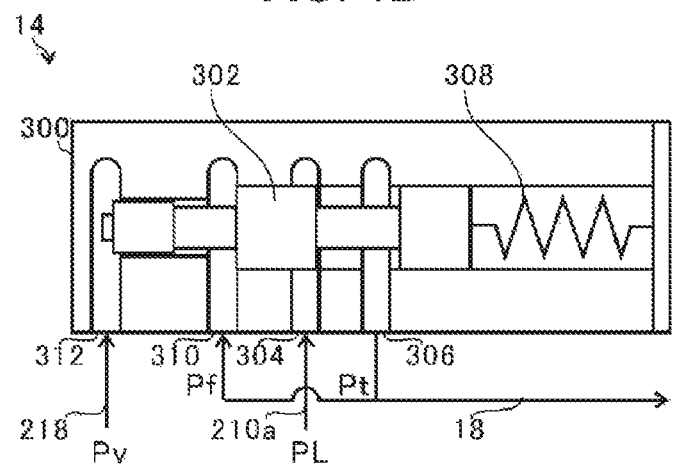
FIG. 4B is a schematic diagram of a configuration of a torque converter pressure control valve according to the present example.
Figure 4C:
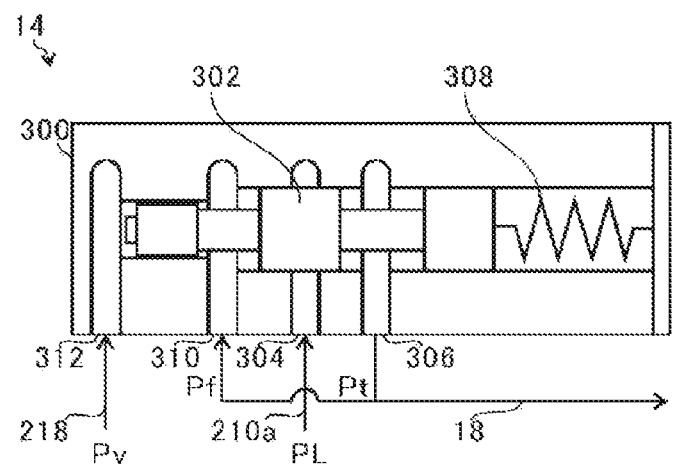
FIG. 4C is a schematic diagram of a configuration of a torque converter pressure control valve according to the present example.

FIGS. 4A to 4C are schematic diagrams of a configuration of the torque converter pressure control valve 14 according to the present example. As illustrated in FIG. 4A, the torque converter pressure control valve 14 has a housing 300 and a spool valve shaft 302 movably housed within the housing 300. The housing 300 has a line pressure port 304 that introduces line pressure PL, and a torque converter pressure port 306 that outputs torque converter pressure Pt. Also, a spring member 308 is assembled to the spool valve shaft 302 to control the operating position of the spool valve shaft 302 such that the housing 300 has a feedback pressure port 310 that introduces feedback pressure Pf. The branch flow path 210a is coupled to the line pressure port 304. The supply flow path 18 is coupled to the torque converter pressure port 306 and the feedback pressure port 310, and the torque converter pressure Pt output from the torque converter pressure port 306 is introduced to the supply port 52a and the feedback pressure port 310. In the state illustrated in FIG. 4A, the line pressure PL is first introduced into the line pressure port 304. The line pressure PL that has been introduced into the line pressure port 304 is output from the torque converter pressure port 306 as the torque converter pressure Pt. The line pressure PL that has been output from the torque converter pressure port 306 is introduced into the feedback pressure port 310 as the feedback pressure Pf. The line pressure PL that has been introduced into the feedback pressure port 310 pushes the spool valve shaft 302 to the right side in FIGS. 4A to 4C. At this time, the pressing force of the spring member 308 is set to be less than the pressing force acting on the spool valve shaft 302 to the right side in FIGS. 4A to 4C by the line pressure PL introduced from the feedback pressure port 310.

As described above, introducing the line pressure PL (the feedback pressure Pf) into the feedback pressure port 310 causes the spool valve shaft 302 to move to a torque converter pressure controlling position (to the right side in FIGS. 4A to 4C). Making the spool valve shaft 302 move to the torque converter pressure controlling position causes the line pressure port 304 to communicate with the torque converter pressure port 306 while throttling the opening area, in the torque converter pressure control valve 14, as illustrated in FIG. 4B. As a result, the torque converter pressure control valve 14 is able to reduce the line pressure to a predetermined torque converter pressure Pt.

Also, the housing 300 has a delivery pressure port 312 that introduces a delivery pressure Pv of the oil delivered from the electric oil pump 204. The coupling flow path 218 is coupled to this delivery pressure port 312. The pressing force of the spring member 308 is set to be lower than the pressing force acting on the spool valve shaft 302 toward the right side in FIGS. 4A to 4C by the delivery pressure Pv introduced from the delivery pressure port 312. By introducing the delivery pressure Pv into the delivery pressure port 312, the spool valve shaft 302 can be made to move to a line pressure cutoff position (toward the right side in FIGS. 4A to 4C). Making the spool valve shaft 302 move to the line pressure cutoff position results in the line pressure port 304 becoming closed off, as illustrated in FIG. 4C. In this way, when the electric oil pump 204 is operated, some of the oil that flows through the discharge flow path 208b is supplied to the torque converter pressure control valve 14, such that the torque converter pressure control valve 14 closes. The electric oil pump 204 is thus able to cut off the introduction flow path (the second flow path R2) that introduces oil into the lock-up mechanism LU of the torque converter 110, by supplying the hydraulic pressure of the oil to the coupling flow path 218.

As described above, the hydraulic pressure supply system S of the present example activates the electric oil pump 204 when idling stop control is executed. When the hydraulic pressure supply system S activates the electric oil pump 204, the introduction flow path (the second flow path R2) that introduces oil into the torque converter 110 (the lock-up mechanism LU) becomes cut off. As a result of the introduction flow path being cut off, oil stops being supplied from the main flow path 210 in the torque converter 110. Therefore, by cutting off the introduction flow path, the electric oil pump 204 can reduce the amount of oil that can be delivered because the electric oil pump 204 only needs to supply oil to each of the hydraulic pressure operated devices other than the torque converter 110. As a result, a smaller electric oil pump than is conventionally used can be used for the electric oil pump 204.

Also, the hydraulic pressure supply system S of the present example causes the electric oil pump 204 to operate from the time idling stop ends (from when the engine is restarted) until the engine speed reaches a predetermined speed or higher. This is because when the engine 102 restarts immediately after idling stop ends, the engine speed is low so the flowrate of oil discharged from the mechanical oil pump 202 is small. When the flowrate of oil discharged from the mechanical oil pump 202 is small, it is difficult to ensure the hydraulic pressure required for the variable transmission 118. Therefore, the hydraulic pressure supply system S of the present example causes the electric oil pump 204 to operate until the engine speed reaches the predetermined speed or higher even after idling stop ends.

At this time, the mechanical oil pump 202 also starts to operate as the engine restarts. Even while the mechanical oil pump 202 is operating, the introduction flow path that introduces oil to the lock-up mechanism LU is cut off while the electric oil pump 204 is operating. As a result of the introduction flow path being cut off, oil stops being supplied from the main flow path 210 to the torque converter 110. Therefore, the amount of oil that can be delivered by the mechanical oil pump 202 is able to be reduced because the mechanical oil pump 202 only needs to supply oil to each of the hydraulic pressure operated devices other than the torque converter 110 as a result of the introduction flow path being cut off. Therefore, a smaller mechanical oil pump than is conventionally used can be used for the mechanical oil pump 202. The number of hydraulic pressure operated devices to which oil is supplied is reduced, so it becomes easy to sufficiently ensure the line pressure required for each of the hydraulic pressure operated devices, even if the mechanical oil pump 202 is smaller than the mechanical oil pump used in the past.

Also, having the introduction flow path be cut off enables the line pressure of the main flow path 210 to be kept high, so the hydraulic pressure supplied to the variable transmission 118 (other hydraulic pressure operated devices other than the torque converter 110) can be kept high. Therefore, after the engine is restarted, the belt 130 of the variable transmission 118 will no longer slip on the cone surfaces 126c and 128c, making it possible to prevent the cone surfaces 126c and 128c from becoming scratched (i.e., prevent the variable transmission 118 from becoming damaged).

Note that the hydraulic pressure supply system S of the present example causes the electric oil pump 204 to stop operating when the engine speed reaches a predetermined speed or higher. When the electric oil pump 204 stops operating, the introduction flow path (the second flow path R2) that introduces oil into the torque converter 110 stops being cut-off, so oil begins to flow through the introduction flow path (the second flow path R2). In the mechanical oil pump 202, the amount and pressure of oil to be delivered increase as the speed of the engine 102 increases. Therefore, the mechanical oil pump 202 is able to sufficiently ensure the line pressure required for each of the hydraulic pressure operated devices including the torque converter 110, even if a smaller mechanical oil pump than is conventionally used is used.

Figure 5:
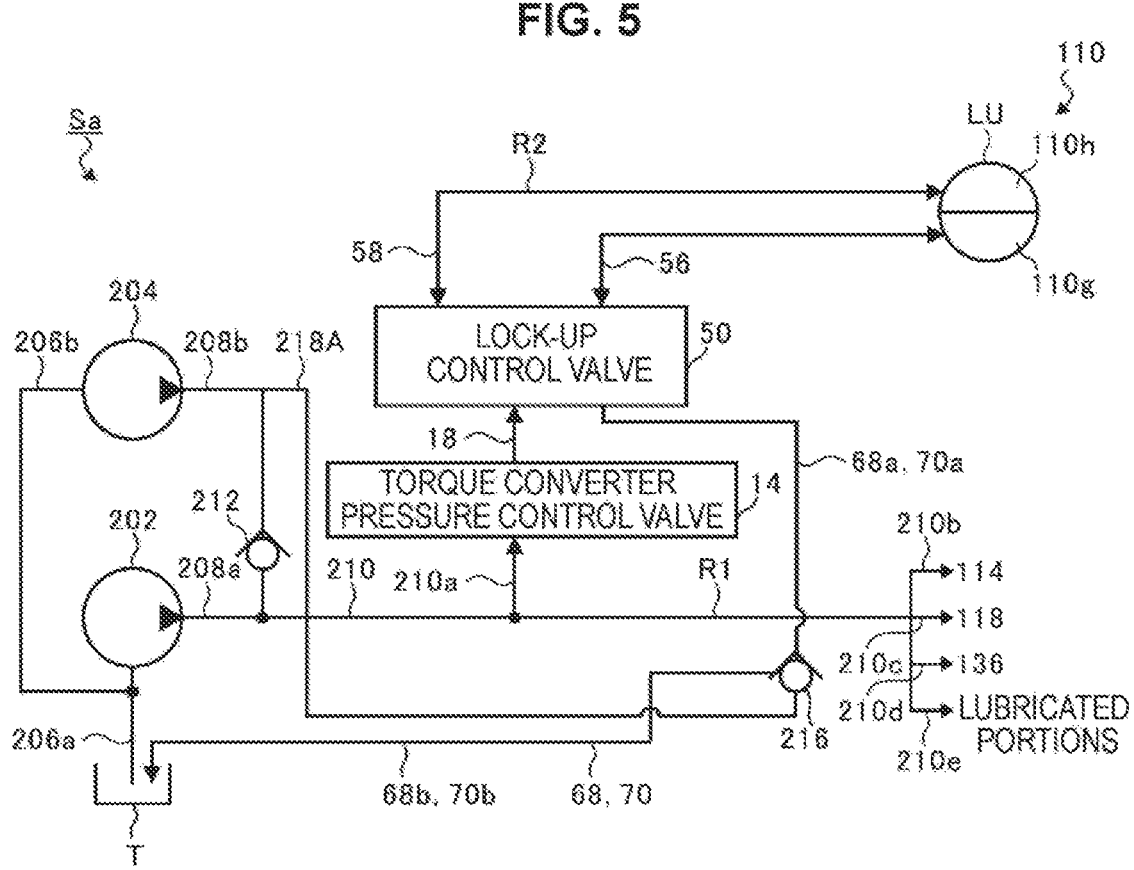
FIG. 5 is a schematic diagram of a configuration of a hydraulic pressure supply system according to a modified example.

FIG. 5 is a schematic diagram of a configuration of a hydraulic pressure supply system Sa according to a modified example. The hydraulic pressure supply system Sa of the present modified example is provided with a coupling flow path 218A that couples the discharge flow path 208b to the cut-off valve 216, instead of the coupling flow path 218 of the example described above. The coupling flow path 218A is coupled at one end to the discharge flow path 208b at a location between the electric oil pump 204 and the check valve 212, and is coupled at the other end to the cut-off valve 216. Therefore, when the electric oil pump 204 is operated, some of the oil that flows to the discharge flow path 208b is supplied to the cut-off valve 216. The cut-off valve 216 closes by the hydraulic pressure of oil supplied from the coupling flow path 218A.

FIGS. 6A to 6C are schematic diagrams of a configuration of the cut-off valve 216 in the modified example The cut-off valve 216 has a housing 400 and a spool valve shaft 402 movably housed within the housing 400. The housing 400 has an introduction port 400a that introduces oil discharged from the lock-up mechanism LU, and a discharge port 400b that discharges oil that has been introduced from the introduction port 400a to the oil pan T. Also, a spring member 404 is assembled to the spool valve shaft 402 to control the operating position of the spool valve shaft 402. The upstream side discharge flow paths 68a and 70a are coupled to the introduction port 400a, and the downstream side discharge flow paths 68b and 70b are coupled to the discharge port 400b.

As illustrated in FIG. 6A, when oil is not being discharged from the lock-up mechanism LU (i.e., when oil is not being introduced into the introduction port 400a), the spool valve shaft 402 closes the introduction port 400a by the pressing force of the spring member 404. At this time, the spool valve shaft 402 also closes the discharge port 400b. On the other hand, when oil is discharged from the lock-up mechanism LU (i.e., when the pressure of oil introduced into the introduction port 400a is greater than the pressing force of the spring member 404), the spool valve shaft 402 opens the introduction port 400a against the pressing force of the spring member 404. At this time, the spool valve shaft 402 also opens the discharge port 400b. In this way, the introduction of oil from the lock-up mechanism LU to the introduction port 400a causes the spool valve shaft 402 to move to an oil discharging position (toward the upper side in FIGS. 6A to 6C). Making the spool valve shaft 402 move to the oil discharging position causes the introduction port 400a to become communicated with the discharge port 400b in the cut-off valve 216, as illustrated in FIG. 6B. As a result, the cut-off valve 216 can discharge oil from the lock-up mechanism LU into the oil pan T.

Also, the housing 400 has a delivery pressure port 400c that introduces the delivery pressure Pv of the oil delivered from the electric oil pump 204. The coupling flow path 218A is coupled to this delivery pressure port 400c. By introducing the delivery pressure Pv into the delivery pressure port 400c, the spool valve shaft 402 can be made to move to an oil discharge stopping position (toward the lower side in FIGS. 6A to 6C). Making the spool valve shaft 402 move to the oil discharge stopping position results in the introduction port 400a and the discharge port 400b becoming closed off, as illustrated in FIG. 6C. At this time, even if oil is discharged from the lock-up mechanism LU, the delivery pressure Pv and the pressing force of the spring member 404 are set to be larger than the pressure of oil introduced into the introduction port 400a. Therefore, the spool valve shaft 402 can be kept in the oil discharge stopping position. In this way, when the electric oil pump 204 is operated, some of the oil that flows through the discharge flow path 208b is supplied to the cut-off valve 216, thus making it possible to close the cut-off valve 216. Therefore, the electric oil pump 204 is able to cut off the return flow path (the second flow path R2) that returns oil from the lock-up mechanism LU to the oil pan T, by supplying the hydraulic pressure of the oil to the coupling flow path 218A.

According to the present modified example, an effect similar to the effect of the example described above can be obtained. That is, according to the present modified example, the mechanical oil pump 202 (the electric oil pump 204) can be made smaller while preventing the variable transmission 118 from becoming damaged.

As described above, according to the hydraulic pressure supply system S of the example described above, the introduction flow path (the second flow path R2) that introduces oil into the lock-up mechanism LU of the torque converter 110 can be cut off by supplying the hydraulic pressure of oil to the coupling flow path 218. That is, the hydraulic pressure supply system S of the example described above has a cut-off mechanism (the coupling flow path 218 and the torque converter pressure control valve 14) that closes off the second flow path R2 provided with the torque converter 110, by oil output from the electric oil pump 204.

Also, according to the hydraulic pressure supply system Sa of the modified example described above, the discharge flow path (the second flow path R2) that discharges oil from the lock-up mechanism LU of the torque converter 110 can be cut off by supplying the hydraulic pressure of oil to the coupling flow path 218A. That is, the hydraulic pressure supply system Sa of the modified example described above has a cut-off mechanism (the coupling flow path 218 and the cut-off valve 216) that closes off the second flow path R2 provided with the torque converter 110, by oil output from the electric oil pump 204.

As a result, the hydraulic pressure supply systems S and Sa are able to stop oil from being supplied to the hydraulic pressure operated devices (the lock-up mechanism LU) of the torque converter 110 while the electric oil pump 204 is operating.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For instance, in the example described above, an example is described in which the coupling flow path 218 couples the discharge flow path 208b to the torque converter pressure control valve 14. However, the present invention is not limited to this. The coupling flow path 218 may directly couple the electric oil pump 204 to the torque converter pressure control valve 14. Also, in the modified example described above, an example is described in which the coupling flow path 218A couples the discharge flow path 208b to the cut-off valve 216. However, the present invention is not limited to this. The coupling flow path 218A may directly couple the electric oil pump 204 to the cut-off valve 216.

Also, in the example described above, a configuration is described in which oil delivered from the electric oil pump 204 is supplied to the torque converter pressure control valve 14. However, the present invention is not limited to this. For instance, the configuration may be one in which an opening/closing mechanism that opens and closes the flow path (i.e., the branch flow path 210a) between the main flow path 210 and the torque converter pressure control valve 14 is provided, and moreover, the coupling flow path 218 couples the electric oil pump 204 to the opening/closing mechanism. With such a configuration as well, the electric oil pump 204 is able to cut off an introduction flow path that introduces oil into the lock-up mechanism LU, by supplying the hydraulic pressure of oil to the coupling flow path 218.

Further, in the modified example described above, a configuration is described in which oil delivered from the electric oil pump 204 is supplied to the cut-off valve 216. However, the present invention is not limited to this. For instance, the configuration may be one in which an opening/closing mechanism that opens and closes the flow path (i.e., the downstream side discharge flow path 70b) between the cut-off valve 216 and the oil pan T is provided, and moreover, the coupling flow path 218A couples the electric oil pump 204 to the opening/closing mechanism. With such a configuration as well, the electric oil pump 204 is able to cut off a return flow path that returns oil from the lock-up mechanism LU to the oil pan T, by supplying the hydraulic pressure of oil to the coupling flow path 218A.

The examples of the present invention make it possible to provide a hydraulic pressure supply system in which a mechanical oil pump can be made smaller.

The present invention can be applied to a hydraulic pressure supply system.

The invention claimed is:

1. A hydraulic pressure supply system comprising:
   a mechanical oil pump configured to operate by power from an engine;
   an electric oil pump configured to operate by power from a motor;
   a first flow path through which an oil supplied from the mechanical oil pump and the electric oil pump flows, the first flow path being coupled to the mechanical oil pump and the electric oil pump;
   a second flow path branching off from the first flow path and configured to cause an oil to return to an oil pan via a torque converter; and
   a cut-off mechanism configured to close off the second flow path by an oil delivered from the electric oil pump,
   wherein the electric oil pump is configured to be driven, when the electric oil pump is driven while the engine stops, from when the engine restarts until a speed of the engine reaches a predetermined speed or higher.

2. The hydraulic pressure supply system according to claim 1, wherein
   the cut-off mechanism comprises a torque converter pressure control valve provided in the second flow path upstream of the torque converter, and configured to control a hydraulic pressure of an oil flowing through the second flow path to a hydraulic pressure able to be supplied to the torque converter, and
   a coupling flow path coupling the electric oil pump to the torque converter pressure control valve, and
   the torque converter pressure control valve is configured to close off the second flow path by a hydraulic pressure of an oil supplied to the coupling flow path.

3. The hydraulic pressure supply system according to claim 1, wherein
   the cut-off mechanism comprises a second flow path cut-off valve provided in the second flow path downstream of the torque converter, and configured to open and close the second flow path, and
   a coupling flow path coupling the electric oil pump to the second flow path cut-off valve, and
   the second flow path cut-off valve is configured to close off the second flow path by a hydraulic pressure of an oil supplied from the coupling flow path.

4. The hydraulic pressure supply system according to claim 2, comprising:
   a first flow path check valve provided between the electric oil pump and a merge portion of the first flow path where an oil delivered from the mechanical oil pump and an oil delivered from the electric oil pump merge,
   wherein the coupling flow path is coupled between the first flow path check valve and the electric oil pump.

5. The hydraulic pressure supply system according to claim 3, comprising:
   a first flow path check valve provided between the electric oil pump and a merge portion of the first flow path where an oil delivered from the mechanical oil pump and an oil delivered from the electric oil pump merge,
   wherein the coupling flow path is coupled between the first flow path check valve and the electric oil pump.

6. The hydraulic pressure supply system according to claim 1, wherein the cut-off mechanism includes a coupling flow path that directly couples a flow of oil from the electric oil pump to the torque converter pressure control valve.

7. The hydraulic pressure supply system according to claim 1, wherein the electric oil pump is configured to actuate, when an idling stop control of the engine is performed.

* * * * *